United States Patent Office

2,769,691
Patented Nov. 6, 1956

2,769,691

PROCESS FOR THE PRODUCTION OF SULPHUR AND HYDROGEN SULPHIDE FROM IRON SULPHIDES

Pietro Achille, Milan, Italy

No Drawing. Application November 19, 1953,
Serial No. 393,227

Claims priority, application Italy September 22, 1953

4 Claims. (Cl. 23—181)

It is known that in nature the iron sulphides that can be directly attacked by acids with formation of hydrogen sulphide are those called "pyrrhotins" and having the formula $Fe_xS_{x+1}$, where X can have values different from one, such as for instance $Fe_8S_9$; when X is equal to the unity there is the iron sulphide $FeS_2$ called "pyrite" that cannot be attacked by acids with formation of hydrogen sulphide.

It is known however that from pyrites it is possible to prepare the ferrous sulphide (FeS) which can be attacked by acids with development of hydrogen sulphide, according to several methods, all directed to the utilisation of the unstable sulphur atom. Thus for instance, the distillation of the unstable sulphur at high temperatures according to the following reaction:

$$FeS_2 \rightarrow FeS + S$$

Or else the treatment with hydrogen and formation of hydrogen sulphide according to the reaction:

$$FeS_2 + H_2 \rightarrow FeS + H_2S$$

Or by partial oxidation with oxygen or air, with formation of sulphur dioxide, or sulphur dioxide and sulphur, or with other reactions not listed whereby from pyrite there is obtained ferrous sulphide, while the unstable sulphur is utilised for other purposes.

It is an object of the present invention to produce hydrogen sulphide, sulphur and hydrochloric acid, characterized by the fact that a suspension of iron sulphides in water is made to react with chlorine, thus obtaining an acid solution of ferric salts, and by reacting the acid solution thus obtained with iron sulphides that can be attacked by acids.

The reactions which characterize the process can be represented as follows:

Using for the process pyrite as the iron sulphide, for reacting with chlorine, and natural pyrrhotin for attacking with the acid mixture there will be obtained:

REACTION A

$2FeS_2 + 15Cl_2 + 16H_2O \rightarrow Fe_2(SO_4)_3 + H_2SO_4 + 30HCl$
$2Fe_{8.5}S_{9.5} + Fe_2(SO_4)_3 + H_2SO_4 + 30HCl \rightarrow$
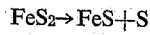
$3S + 16H_2S + 15FeCl_2 + 4FeSO_4$ $2FeS_2 + 2Fe_{8.5}S_{9.5} + 15Cl_2 + 16H_2O \rightarrow$
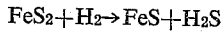
$3S + 16H_2S + 15FeCl_2 + 4FeSO_4$ with production of sulphur and hydrogen sulphide.

Using for the process the natural pyrite as iron sulphide for reacting with chlorine, and ferrous sulphide (obtained from pyrite by distillation of the unstable sulphur) for reaction with the acid mixture there will be obtained:

REACTION B

$2FeS_2 + 15Cl_2 + 16H_2O \rightarrow Fe_2(SO_4)_3 + H_2SO_4 + 30HCl$
$17FeS_2 + 17H_2 \rightarrow 17FeS + 17S$
$17FeS + Fe_2(SO_4)_3 + H_2SO_4 + 30HCl \rightarrow$
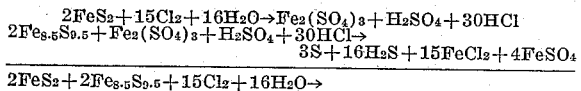
$S + 16H_2S + 15FeCl_2 + 4FeSO_4$ $19FeS_2 + 15Cl_2 + 16H_2O \rightarrow 18S + 16H_2S + 15FeCl_2 + 4FeSO_4$ with production of sulphur and hydrogen sulphide.

Using for the process the natural pyrite for reacting with chlorine and ferrous sulphide (obtained from pyrite by treatment with hydrogen) for reaction with the acid mixture there will be obtained:

REACTION C

$2FeS_2 + 15Cl_2 + 16H_2O \rightarrow Fe_2(SO_4)_3 + H_2SO_4 + 30HCl$
$17FeS_2 + 17H_2 \rightarrow 17FeS + 17H_2S$
$17FeS + Fe_2(SO_4)_3 + H_2SO_4 + 30HCl \rightarrow$
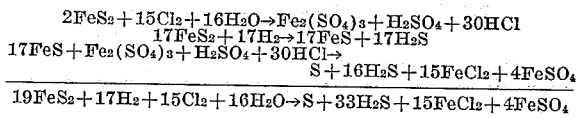
$S + 16H_2S + 15FeCl_2 + 4FeSO_4$ $19FeS_2 + 17H_2 + 15Cl_2 + 16H_2O \rightarrow S + 33H_2S + 15FeCl_2 + 4FeSO_4$ with production of sulphur and hydrogen sulphide.

Using for the process pyrrhotin as iron sulphide, both for reacting with chlorine and with the acid mixture there will be obtained, for instance:

REACTION D

$Fe_8S_9 + 39Cl_2 + 36H_2O \rightarrow 3Fe_2(SO_4)_3 + 2FeCl_3 + 72HCl$
$5Fe_8S_9 + 3Fe_2(SO_4)_3 + 2FeCl_3 + 72HCl \rightarrow$
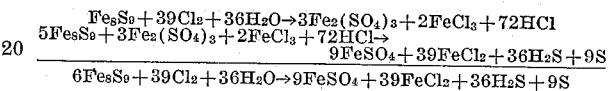
$9FeSO_4 + 39FeCl_2 + 36H_2S + 9S$ $6Fe_8S_9 + 39Cl_2 + 36H_2O \rightarrow 9FeSO_4 + 39FeCl_2 + 36H_2S + 9S$ with production of sulphur and hydrogen sulphide.

Using for the process as iron sulphide, both for reacting with chlorine and for reacting with the acid mixture, the ferrous sulphide obtained from pyrite by distillation of the unstable sulphur, there will be obtained:

REACTION E

$33FeS_2 \rightarrow 33FeS + 33S$
$6FeS + 27Cl_2 + 24H_2O \rightarrow 2Fe_2(SO_4)_3 + 2FeCl_3 + 48HCl$
$27FeS + 2Fe_2(SO_4)_3 + 2FeCl_3 + 48HCl \rightarrow$
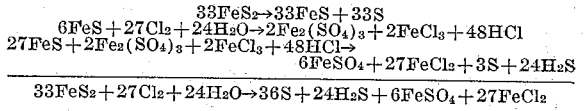
$6FeSO_4 + 27FeCl_2 + 3S + 24H_2S$ $33FeS_2 + 27Cl_2 + 24H_2O \rightarrow 36S + 24H_2S + 6FeSO_4 + 27FeCl_2$ with production of sulphur and hydrogen sulphide.

Using for the process, as iron sulphide, both for reacting with chlorine and for reacting with the acid mixture, the ferrous sulphide obtained from pyrite by treatment with hydrogen, there will be obtained:

REACTION F

$33FeS_2 + 33H_2 \rightarrow 33FeS + 33H_2S$
$6FeS + 27Cl_2 + 24H_2O \rightarrow 2Fe_2(SO_4)_3 + 2FeCl_3 + 48HCl$
$27FeS + 2Fe_2(SO_4)_3 + 2FeCl_3 + 48HCl \rightarrow$
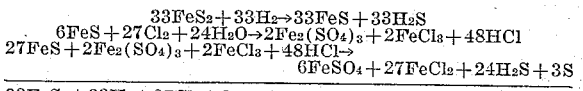
$6FeSO_4 + 27FeCl_2 + 24H_2S + 3S$ $33FeS_2 + 33H_2 + 27Cl_2 + 24H_2O \rightarrow 57H_2S + 3S + 6FeSO_4 + 27FeCl_2$ with production of sulphur and hydrogen sulphide.

In the above described reactions, it is possible to arrive at the same results by treating beforehand the acid mixture containing ferric salts with hydrogen sulphide thereby obtaining an acid mixture of ferrous salts with some sulphur in suspension, corresponding to the hydrogen sulphide employed.

Thus for instance, following Reaction E, there will be obtained the following reactions corresponding to the different stages of the process:

REACTION G

$33FeS_2 \rightarrow 33FeS + 33S$
$6FeS + 27Cl_2 + 24H_2O \rightarrow 2Fe_2(SO_4)_3 + 2FeCl_3 + 48HCl$
$2Fe_2(SO_4)_3 + 2FeCl_3 + 48HCl + 3H_2S \rightarrow 6FeSO_4 + 54HCl + 3S$
$27FeS + 6FeSO_4 + 54HCl \rightarrow 6FeSO_4 + 27FeCl_2 + 27H_2S$ $33FeS_2 + 27Cl_2 + 24H_2O \rightarrow 36S + 24H_2S + 6FeSO_4 + 27FeCl_2$ If it is desired (in particular for utilizing ferrous salts, obtained as by-product of the process, or for recovering the hydrochloric acid as described hereunder) to have present only iron chloride, it is foreseen the treatment of the mixture of salts, whether ferric or ferrous, with calcium chloride in order to transform the iron sulphate in iron chloride.

Thus for instance, following Reaction B, there will be obtained the following reactions:

REACTION H

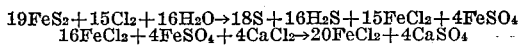
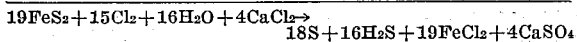

If it is wanted, particularly on economic grounds for a better exploitation of the chlorine employed, it is possible, from the reaction between iron sulphides and chlorine, to obtain the production and the partial or full recovery of the hydrochloric acid produced, both by using in the reaction a quantity of water insufficient for the solubilisation of the hydrochloric acid produced, or after the reaction, by distillation.

It is unnecessary to note that in relation to the quantity of hydrochloric acid being recovered, from the stoichiometric point of view the quantity of hydrogen sulphide produced will decrease. In this respect it has been ascertained that pyrrhotin and the ferrous sulphide cannot be attacked by ferric salts except in the presence of small quantities of free acids that have the purpose of initiating the mechanism of the reaction:

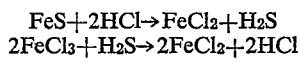
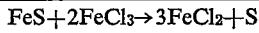

Often the natural iron sulphides are accompanied by other metals, that are interesting for their economic values; now, according to the process as claimed, these metals remain in the unsoluble state in the residue from the attacking of the iron sulphide by the acid mixture, and it is therefore possible to recover same according to the known methods.

The mixture of ferrous salts or the ferrous chloride obtained after treatment with calcium chloride, by-products of the process, may be utilised with the known methods.

All the various reactions referred to above may be suitably combined with one another in the different most convenient quantitative ratios in order to obtain the most economical exploitation of the sulphides in the form of sulphur or hydrogen sulphide, and of the chlorine as hydrochloric acid.

From the technological and industrial point of view, it is interesting to note that the chlorine and hydrogen necessary for the processes as claimed can be supplied from the known electrolytic cells for the production from sodium chloride, of caustic soda, chlorine and hydrogen, and that the hydrogen sulphide produced, besides the other known utilisations, can be combined with the caustic soda from the very cells for producing sodium sulphide and sodium hydrosulphide.

In order that the invention may be more readily understood the following examples are given.

Example No. 1

285 grs. of natural pyrite, having a sulphur content of 47.5% are finely ground and suspended in 4700 grs. of water in an apparatus lined with an acid resistant material, and provided with a suitable stirring system.

Into the pyrite suspension there is made to bubble chlorine, which may be moist, such as it comes for instance from the known electrolytic cells for the production of caustic soda. The chlorine supply is controlled until the mass cannot absorb any further quantity.

There is obtained a mixture of ferric sulphate, sulphuric acid and hydrochloric acid. In the same apparatus or another one, there is added to the acid mixture obtained as above, 1800 grs. of; natural pyrrhotin having a sulphur content of 35%. There is a development of hydrogen sulphide that is recovered and utilized, and there is obtained a solution of ferrous sulphate and chloride, having in suspension some sulphur and the non ferrous metals sulphides which accompany the natural pyrrhotin and pyrite. From the residue there is extracted the sulphur with known methods, and the non-ferrous metals are also recovered.

The resulting ferrous salts solution is treated with $CaCl_2$, in order to separate the sulphates in the form of calcium sulphate, and there is thus obtained a solution of ferrous chloride which can be used according to the known methods for the utilisation of the chlorine and of the iron. From 285 grs. of pyrite, and 1800 grs. of pyrrhotin and 1170 grs. of chlorine there are obtained 92 grs. of sulphur and 480 grs. of hydrogen sulphide.

Example No. 2

285 grs. of finely ground pyrite are suspended in 650 grs. of water. It is then proceeded as described in Example No. 1, there is developed gaseous hydrochloric acid which is recovered and there is obtained a mixture containing ferric sulphate, sulphuric acid, and hydrochloric acid.

1015 grs. of pyrite are treated in an apposite furnace at a temperature of about 450° with a stream of hydrogen coming for instance from the very electrolytic cells for the production of caustic soda and chlorine. There is obtained hydrogen sulphide which is recovered, and the corresponding ferrous sulphide.

The ferrous sulphide is treated with the acid mixture obtained by chlorination of the pyrite; there is developed hydrogen sulphide that is utilised and there is obtained a solution of ferrous sulphate and ferrous chloride having in suspension sulphur and the sulphides of the non ferrous metals which accompany the natural pyrite.

The suspension is filtered and from the residue there is extracted the sulphur and the non ferrous metals are also recovered with the known methods.

From 1300 grs. of pyrite and 1150 grs. of chlorine and 17 grs. of hydrogen there are obtained 710 grs. of hydrochloric acid, 410 grs. of hydrogen sulphide, and 30 grs. of sulphur.

Example No. 3

2650 grs. of pyrite having a sulphur content of 47% are heated in an apposite furnace at the temperature of about 700–800° C. in order to distillate the unstable sulphur which is being recovered. There are obtained 2030 grs. of ferrous sulphide.

700 grs. of ferrous sulphide thus obtained are finely ground and suspended in 6500 grs. of water. In the ferrous sulphide suspension there is made to bubble chlorine until saturation is attained.

There is thus obtained a solution containing ferric sulphate, ferric chloride and hydrochloric acid. The solution is then treated with hydrogen sulphide prepared as described hereunder and there is obtained a solution of ferrous sulphate and hydrochloric acid having in suspension sulphur corresponding to the stoichiometric quantity of hydrogen sulphide employed. The sulphur is filtered out and recovered.

The acid solution of ferrous sulphate and hydrochloric acid is distilled in order to recover the wanted quantity of hydrochloric acid.

The remaining 1330 grs. of ferrous sulphate obtained from pyrite as described above are added to the acid solution left over from the distillation of the hydrochloric acid; there is developed hydrogen sulphide corresponding to the residual free acidity and there is obtained a solution of ferrous sulphate and chloride, having in suspension the sulphides of the non ferrous metals that accompany the natural pyrite; from the filtered residue it is possible to recover them by known methods.

From 2650 grs. of pyrite and 2100 grs. of chlorine there are obtained 670 grs. of sulphur, 285 grs. of hydrogen sulphide, and 1090 grs. of hydrochloric acid.

What I claim is:

1. A process adapted for the production at room temperature of hydrogen sulphide and sulphur from pyrite which comprises reacting finely ground pyrite suspended in water with chlorine with a molecular ratio of two parts of pyrite to 15 parts of chlorine to form a solution of ferric sulphate, sulphuric acid and hydrochloric acid, the amount of water being insufficient for the complete solubilization of the products obtained, reacting the solution thus obtained with ferrous sulphide to produce hydrogen sulphide and a suspension of sulphur in a solution of ferrous sulphate and ferrous chloride, recovering hydrogen sulphide and separating and recovering sulphur from said suspension.

2. A process, according to claim 1, in which there are substantially 16 parts of water with respect to the molecular ratio thus causing the formation of gaseous hydrogen chloride which is recovered.

3. A process, according to claim 1, in which as ferrous sulphide there is employed the product obtained from natural pyrite by distillation of the sulphur.

4. A process, according to claim 1, in which as ferrous sulphide there is employed the product obtained from natural pyrite by reaction with hydrogen.

References Cited in the file of this patent

UNITED STATES PATENTS

| | | |
|---|---|---|
| 1,078,779 | Forland | Nov. 18, 1913 |
| 1,929,502 | Levy | Oct. 10, 1933 |
| 2,128,107 | Tyner | Aug. 23, 1938 |

FOREIGN PATENTS

| | | |
|---|---|---|
| 15,962/28 | Australia | Oct. 1, 1928 |
| 382,697 | Great Britain | Nov. 3, 1932 |

OTHER REFERENCES

Encyclopedia of Chemical Reactions, by C. A. Jacobson, vol. 4, 1951 ed., page 93. Reinhold Publishing Corp., New York, N. Y.

J. W. Mellor's "A Comprehensive Treatise on Inorganic and Theoretical Chem.," vol. 14, 1935 ed., page 227. Longmans, Green and Co., New York, N. Y.